United States Patent Office 2,768,368
Patented Oct. 23, 1956

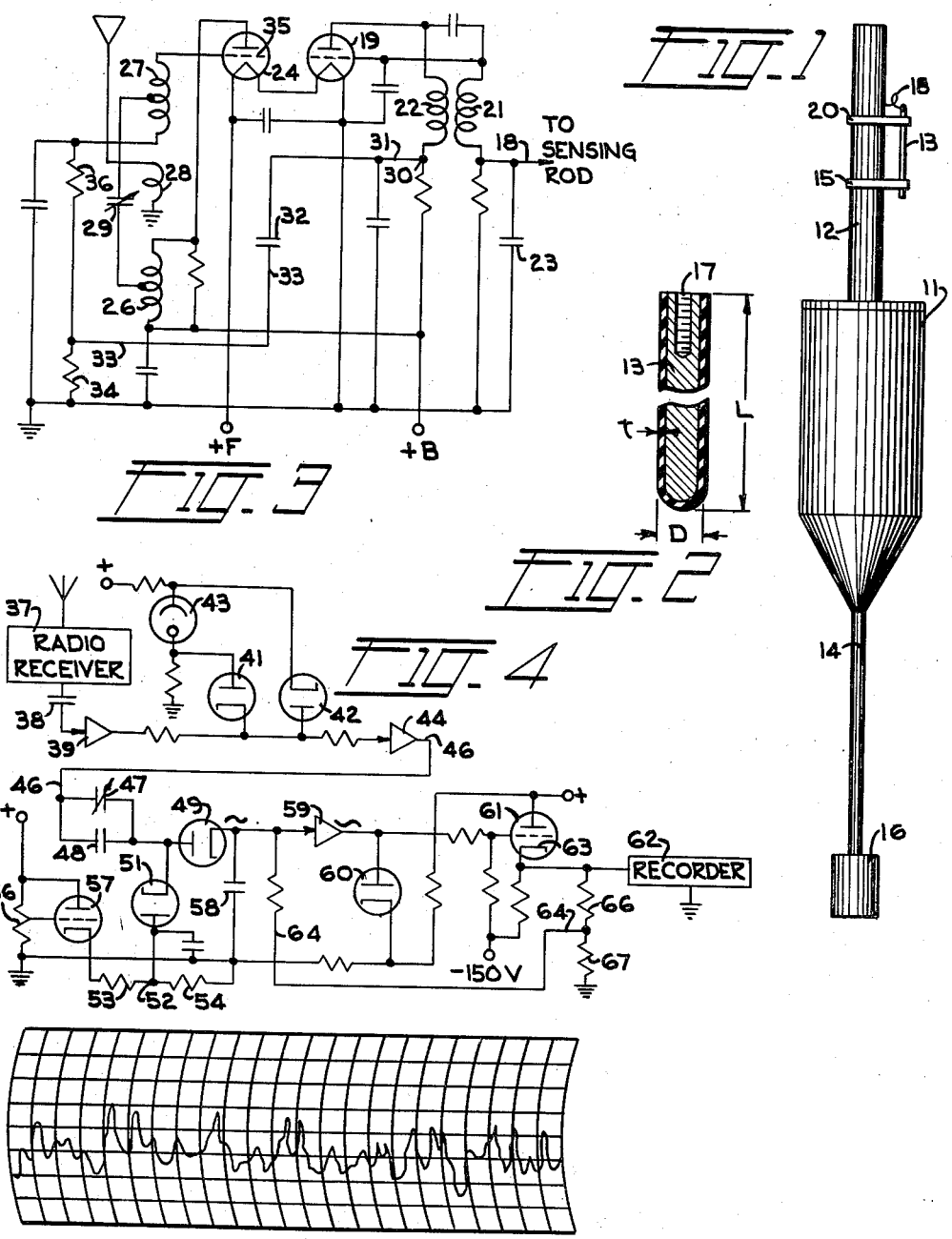

2,768,368

MARINE WAVE RECORDER

Robert Crane, Jr., Santa Barbara, Calif., and Kenneth L. See, Mount Kisco, N. Y., assignors to General Precision Laboratory Incorporated, a corporation of New York Application March 30, 1954, Serial No. 419,886

5 Claims. (Cl. 340—207)

This invention relates to devices for measuring liquid waves and more specifically to devices for continuous measurement of the vertical displacement of small surface water waves.

It is desirable for some purposes to ascertain the texture or roughness of the surface of water at sea or on a large body such as a bay. The quantity of interest is the vertical crest-to-trough dimension of the smaller waves or ripples, that is, of waves measured in inches or in fractions of an inch. Waves of wavelength longer than a foot or so are not of interest in many cases. Since in the open sea large and small waves usually exist together, the measurement problem includes the task of measuring the ripples in the presence of the large waves upon which they are imposed.

The present invention provides apparatus for measuring small waves while responding relatively little to large waves. That is, the apparatus responds to the higher frequency components of the wave excitation but has a low amplitude response to the lower frequency components. The apparatus includes a component designed to be floated in a liquid body such as salt water, on which the waves are to be measured. The component is spindle-shaped and floats upright, its center of buoyancy being submerged to such depth that its vertical motion is relatively unaffected by small waves, but not submerged so deeply as to prevent the component from rising and falling with large waves. At the water line of the component a vertical rod device senses the height of the water surface relative to the floating component, and generates a signal representing this height.

The mechanical filtering action depends on the mass of the device, on the depth of immersion of its center of buoyancy, and on other factors. It distinguishes, although not sharply, between large and small waves on the basis of the depth and periodicity of water disturbance caused by them.

Associated with the sensing device there is a transmitter for continuously transmitting the sensing signal to a receiver mounted on a boat or aircraft. The transmission may be by sonic or ultrasonic vibrations or by electromagnetic radiation. The receiver includes interpreting and display devices for continuously furnishing a visual display or a graphic record in terms representing ripple height plotted against time.

In one embodiment the sensing device includes a capacitor varied by variations in the water level. These variations of the capacitor vary the frequency of a low-frequency electrical oscillation. This oscillation is made to modulate a higher frequency carrier which is radiated from an antenna carried by the floating component, modulation being either of the frequency or of the amplitude of the carrier. The receiver includes a demodulator, discriminator and recorder.

The principal purpose of this invention is to measure the displacement or contour of water waves.

Another purpose is to provide apparatus for measuring the height of small waves or ripples in the presence of larger waves on the surface of any body of water having a depth greater than a selected amount.

Another purpose is to provide apparatus for continuously measuring the amplitude of surface waves in conductive liquid, continuously transmitting the measured values, and continuously receiving, interpreting and recording the values.

Another purpose is to provide apparatus for continuously measuring the amplitude of surface waves in conductive liquid by completely automatic and self-contained means, continuously transmitting the measured values by radio, and continuously receiving the transmitted values, interpreting and recording them as a continuous time-contour graph.

A further understanding of this invention may be secured from the detailed description and drawings, in which:

Figure 1 depicts a floating unit containing a wave height sensing device.

Figure 2 is a cross sectional view of the sensing rod.

Figure 3 is a schematic diagram of the modulator and transmitter.

Figure 4 is a schematic diagram of the receiver and recorder.

Figure 5 is a graphic record of wave height made by the described embodiment.

In one mode of operation, in order to secure the greatest utility the floating unit is expendable and is dropped by parachute from an aircraft to the water surface which is to be measured. The floating unit is secured to its parachute through a link which is soluble in water, so that shortly after the unit strikes the water the parachute is detached. The floating unit contains a sensing device and a radio transmitter, the receiver being on the aircraft.

The floating unit as illustrated in Fig. 1 includes a buoyant chamber 11 containing a variable oscillator and radio transmitter circuit. A keel rod 14 and weight 16 are secured to the lower end of the chamber 11 and are adjusted in length and weight so that the center of gravity of the unit is considerably below its center of buoyancy, thus maintaining the unit in a floating stable vertical position. A cylinder 12 composed of a suitable insulating material impervious to water is secured to the upper end of the chamber and extends vertically thereabove. The cylinder 12 encloses a quarter-wave vertical antenna which may be fed by a coaxial line suitably matched as is well understood by those skilled in the art. The distance of the center of buoyancy below the mean water line is adjustable by varying the designed length of the cylinder 12, and of the mass. This distance partly determines the filtering action of the device tending to prevent large waves from affecting it. Roughly, waves having a length greater than the distance from the center of buoyancy and the means water level are prevented from affecting measurements made by the device.

A sensing rod 13 is attached to the cylinder 12 by any suitable means such as brackets 15 and 20. The sensing rod constitutes the instrumentality for determining the small wave height and is therefore so positioned as respects the floating unit that the calm water level extends about midway thereof. The sensing rod itself is composed of metal provided with an insulating and dielectric coating which is impervious to and unwettable by salt water. As examples of suitable coatings having the required properties the rod 13 may have its external surface coated with waxed enamel or if desired a thin layer of tetrafluoroethylene may be applied thereto. In any event the thickness of the coating is so chosen as respects its dielectric constant as to provide a capacitance of approximately 200 mmf. per linear inch of the rod between the metal of the rod and the surrounding water. The upper end of the sensing rod 13 is provided with a tapped hole 17, Fig. 2, to receive a binding screw or other electrical connection, to which the conductor 18 is fastened to form one path between the capacitor sensing rod 13 and the oscillator circuit located interiorly of the floating unit 11. The other or return path between the capacitor formed by the coated sensing rod and the oscillator is constituted by the surrounding water medium in contact with a variable length of the sensing rod 13 and the exterior metallic shell of the chamber 11. The permissible specific water resistance depends on the design, which may be such as to permit operation in fresh water. However the example here described is intended for use in salt water and the parameters are such as to require the high conductivity of sea water for proper operation.

The transmitter circuit located within the chamber 11 includes a triode blocking oscillator 19, Fig. 3, having a median frequency of 1500 C. P. S. Its tank circuit includes a grid coil 21, a plate coil 22 and a capacitor 23. The conductor 18 is connected to the sensing rod so that its capacitance is in parallel with that of capacitor 23. The range of capacitance of the sensing rod then varies the frequency between 1100 and 1900 C. P. S.

The radio frequency oscillator includes triode 24 and plate and grid coils 26 and 27, with antenna power at 75 Mc. P. S. taken from a single-turn coil 28. A variable capacitor 29 is provided for adjustment of the frequency. The modulation oscillator 19 is coupled to the radio frequency oscillator 24 through conductor 31, capacitor 32, conductor 33 and coupling resistors 34 and 36.

The modulation oscillator 19 and radio frequency oscillator 24 comprise a conventional squelch circuit emitting short, nearly rectangular pulses of radio frequency energy at a pulse frequency equal to the modulation oscillation frequency. As is well understood in the art, the operation of this circuit depends upon the variation of potential at the end terminal 30 of plate coil 22 at the modulation rate. This potential variation is applied to the control grid 35 of radio frequency oscillator 24. Biases and potentials are so arranged that the potential applied to grid 35 cuts off tube 24 for most of the modulation cycle, preventing it from oscillating, and permits tube 24 to oscillate only when the modulating potential is most positive. This results in permitting triode 24 to transmit short bursts or pulses, separated by longer periods of non-transmission, the duration of the transmitted bursts or pulses being about 85 microseconds at the center modulating frequency.

The receiver includes a conventional 75 Mc. P. S. radio receiver 37, Fig. 4, having a video output consisting of positive pulses at the modulating frequency of 1100 to 1900 C. P. S. These pulses are similar to the transmitted pulses in being rectangular, with a duration on the order of 85 microseconds, the radio receiver being wide bank enough to preserve the rectangular pulse shape reasonably well.

The pulses are coupled through capacitor 38 to a clipper-amplifier 39. Its output is applied to a limiter stage including diodes 41 and 42 and a 105-volt regulator tube 43. The output potential is an accurately formed series of rectangular pulses having peak-to-peak potential of 105 volts. This output is amplified in power amplifier 44.

The power-amplified positive pulse of 105-volt peak-to-peak potential is passed through conductor 46 to a pair of capacitors 47 and 48 connected in parallel and coupling the signal to a discriminator. Capacitor 47 is made adjustable to compensate for any variation in the center frequency of the transmitter modulator caused by replacement of the sensing unit.

The discriminator includes diodes 49 and 51, the latter draining negative portions of the signal to a constant-potential point 52 on a voltage divider consisting of resistors 53 and 54. The potential applied to this voltage divider is manually controlled by a rheostat 56 and a triode 57. The discriminator applies a positive charge to a capacitor 58 at a rate dependent upon the signal frequency. The integrated positive potential of capacitor 58 is amplified and inverted by direct-coupled amplifier 59 and limited by diode 60, which prevents the potential rising positively so high as to damage the recorder. The potential is then applied through cathode follower 61 to a pen recorder 62. The output from cathode 63 of cathode follower 61 is a positive or negative direct-current potential having a value representative of the transmitter modulator frequency. This output is fed back in negative sense through conductor 64 so as to hold the potential at the input of amplifier 59 substantially constant. The scale of the output signals recorded by recorder 62 is determined and may be adjusted by voltage divider resistors 66 and 67.

The pen recorder 62 draws a graph having an abscissa time scale and an ordinate scale representing ripple height. An example of such a graph, secured by use of an instrument similar to the described embodiment, is illustrated in Fig. 5.

What is claimed is:

1. A marine wave recorder comprising, a vertical floating unit, a sensing means mounted thereon generating an electrical quantity which varies in proportion to the wave height of the water surrounding said floating unit, a radio transmitter located in said floating unit generating a radio frequency signal, means for modulating said radio frequency signal by said electrical quantity to produce a modulated signal, and means for radiating said modulated signal.

2. A marine wave recorder comprising, a vertical floating unit having a portion thereof adapted to extend above the level of a body of water in which it is suspended, a sensing element mounted thereon and partly immersed in the body of water, said sensing element emitting an electrical signal representative of the water level relative to the center of buoyancy of said floating unit, a radio transmitter positioned in said floating unit generating a radio frequency signal, means for modulating said radio frequency signal by said electrical signal to produce a modulated signal, and means for radiating said modulated signal.

3. A marine wave recorder comprising, a vertical floating unit having a portion thereof adapted to extend above the level of a body of water in which it is immersed, a vertical rod having a dielectric coating fastened to said extended portion and positioned to be partly immersed in the body of water, said metal rod, dielectric coating and the water in contact therewith forming a condenser the capacity of which is proportional to the water level relative to the center of buoyancy of said floating unit, a radio transmitter positioned in said floating unit generating a radio frequency signal, an oscillator including said condenser producing a modulating signal the frequency of which is proportional to the capacity of said condenser, means for modulating said radio frequency signal by said modulating signal to produce a modulated signal, and means for radiating said modulated signal.

4. A marine wave recorder comprising, a floating casing adapted to be immersed in a body of water, an extension member extending vertically above said casing and projecting above the water level, sensing means fastened to said extension and positioned to be partly immersed in and partly clear of said body of water, said sensing means having an electrical capacity which varies in proportion to the water level relative to the center of buoyancy of said casing, a radio transmitter positioned in said casing generating a radio frequency signal, means for modulating said radio signal in accordance with the capacity of said sensing means to produce a modulated signal, and means for radiating said modulated signal.

5. A marine wave recorder comprising, a floating casing adapted to be immersed in a body of water, an extension member fastened thereto and extending vertically above the water level, a metal rod having a dielectric coating fastened to said extension member in parallel therewith and positioned to be partly immersed in and partly above said body of water, said metal rod, dielectric coating and the water in contact therewith constituting a condenser the capacity of which is proportional to the portion of the rod immersed in the body of water, a radio transmitter contained within said casing generating a radio frequency signal, an oscillatory circuit including said condenser producing a modulating signal the frequency of which is dependent on the capacity of said condenser, means for modulating said radio frequency signal by said modulating signal to produce a modulated signal, and antenna means contained within said extension member for radiating said modulated signal.

References Cited in the file of this patent

UNITED STATES PATENTS

| | | |
|---|---|---|
| 1,255,034 | Mason | Jan. 29, 1918 |
| 2,403,603 | Korn | July 9, 1946 |
| 2,542,627 | Chevallier | Feb. 20, 1951 |
| 2,544,012 | Edelman | Mar. 6, 1951 |
| 2,592,159 | Klebba et al. | Apr. 8, 1952 |